(12) United States Patent
Schran

(10) Patent No.: US 8,560,596 B2
(45) Date of Patent: *Oct. 15, 2013

(54) METHOD AND SYSTEM FOR SCREENING REMOTE SITE CONNECTIONS AND FILTERING DATA BASED ON A COMMUNITY TRUST ASSESSMENT

(75) Inventor: Adam R. Schran, Philadelphia, PA (US)

(73) Assignee: Ascentive LLC, Philadelphia, PA (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/478,401

(22) Filed: Jun. 4, 2009

(65) Prior Publication Data

US 2009/0240769 A1    Sep. 24, 2009

Related U.S. Application Data

(63) Continuation of application No. 10/370,201, filed on Feb. 20, 2003, now Pat. No. 7,546,338.

(60) Provisional application No. 60/360,081, filed on Feb. 25, 2002.

(51) Int. Cl.
   *G06F 15/16* (2006.01)
(52) U.S. Cl.
   USPC .......................................................... 709/203
(58) Field of Classification Search
   USPC ........................................ 709/203, 225, 229
   See application file for complete search history.

(56) References Cited

U.S. PATENT DOCUMENTS

| | | | |
|---|---|---|---|
| 5,706,507 A | 1/1998 | Schloss | |
| 5,740,549 A | 4/1998 | Reilly et al. | |
| 5,774,670 A | 6/1998 | Montulli | |
| 5,911,043 A * | 6/1999 | Duffy et al. | 709/203 |
| 5,974,429 A | 10/1999 | Strub et al. | |
| 6,065,055 A | 5/2000 | Hughes et al. | |
| 6,092,201 A | 7/2000 | Turnbull et al. | |
| 6,134,550 A | 10/2000 | Van Oorschot et al. | |
| 6,389,372 B1 | 5/2002 | Glance et al. | |
| 6,510,458 B1 | 1/2003 | Berstis et al. | |
| 6,745,367 B1 * | 6/2004 | Bates et al. | 715/205 |
| 6,772,139 B1 | 8/2004 | Smith, III | |
| 6,772,214 B1 | 8/2004 | McClain et al. | |
| 6,981,040 B1 * | 12/2005 | Konig et al. | 709/224 |
| 7,203,753 B2 | 4/2007 | Yeager | |
| 2001/0011365 A1 * | 8/2001 | Helfman | 717/1 |

(Continued)

OTHER PUBLICATIONS

"Cookie Crusher Controls Web Cookies," printout from web site: http://www.thelimitsoft.com/cookie.html, printout date: Apr. 19, 2000 (2 pgs.).

(Continued)

*Primary Examiner* — Jason Recek

(74) *Attorney, Agent, or Firm* — Panitch Schwarze Belisario & Nadel LLP

(57) ABSTRACT

Remote site connections are screened based on assessments performed by members of a trust community. Data based on a plurality of-end user assessments of particular remote websites are received at a server from a plurality of end-users. Each end-user is associated with a specific client machine which is in communication with the server. The server generates assessment scores based on the data. The server transmits the assessment scores to the client machines. The client machine selectively takes protective action against ones of the particular remote websites that have an undesirable assessment score generated by the server.

29 Claims, 3 Drawing Sheets

(56) References Cited

U.S. PATENT DOCUMENTS

| | | | |
|---|---|---|---|
| 2002/0046041 A1* | 4/2002 | Lang | 705/1 |
| 2002/0069129 A1 | 6/2002 | Akutsu et al. | |
| 2002/0165986 A1* | 11/2002 | Tarnoff | 709/246 |
| 2003/0014659 A1* | 1/2003 | Zhu | 713/200 |
| 2003/0037250 A1 | 2/2003 | Walker et al. | |
| 2003/0041266 A1* | 2/2003 | Ke et al. | 713/201 |

OTHER PUBLICATIONS

"Webroot's Window Washer," printout from web site: http://www.webroot.com/washer.html, printout date: Apr. 19, 2000 (5 pgs.).

PCWorld.com, Software Utilities, "Cookie Manager," printout from web site: http://www.pcworld.com/top400/article/0,1361,15771+1+,00.html, printout date: Apr. 19, 2000 (3 pgs.).

Junkbusters, "How Web Servers' Cookies Threaten Your Privacy," printout from web site: http://www.junkbusters.com/ht/en/cookies.html, printout date: Mar. 21, 2000, (5 pgs.).

Junkbusters, "Alert on Web Privacy," printout from web site: http://www.junkbusters.com/cgi-bin/privacy, printout date: Mar. 21, 2000, (2 pgs.).

"Cookie Software PC," printout from web site: http://www.cookiecentral.comfiles.html, printout date: Mar. 21, 2000 (4 pgs.).

"Cookie Pal," printout from web site: http://www.cookiecentral.comfiles.html, printout date: Mar. 21, 2000 (4 pgs.).

Cookie Cruncher Home Page, "Cookie Cruncher," printout from web site: http://www.rbaworld.com/Programs/CookieCruncher, printout date: Mar. 19, 2000 (2 pgs.).

* cited by examiner

METHOD AND SYSTEM FOR SCREENING REMOTE SITE CONNECTIONS AND FILTERING DATA BASED ON A COMMUNITY TRUST ASSESSMENT

CROSS-REFERENCE TO RELATED APPLICATIONS

This application is a continuation of copending U.S. application Ser. No. 10/370,201 filed Feb. 20, 2003, which is incorporated herein by reference in its entirety.

This application claims the benefit of U.S. Provisional Application No. 60/360,081, filed Feb. 25, 2002, entitled "Method and System for Screening Remote Site Connections and Filtering Data Based on a Community Trust Assessment," which is incorporated herein by reference in its entirety.

BACKGROUND OF THE INVENTION

The interactive nature of the World Wide Web has proved to be a powerful marketing tool, allowing businesses and consumers to communicate on a one-to-one basis. As the Internet continues to be embraced by marketers worldwide, it is within reason to expect those marketers to exercise due diligence in limiting youth exposure to certain web-based content. Controlling access to websites inappropriate to younger users is key for age-sensitive marketers. Furthermore, without any type of protection, Internet users of any age are subject to receiving unsolicited emails and cookie files from untrustworthy websites.

Several inexpensive and easy to install software programs exist that filter out content that end-users deem to be inappropriate. Brand names, including Cyber Patrol®, Cybersitter®, Cyber Snoop®, SuperScout, SurfControl®, Net Nanny® and Surf-Watch®, have been developed and are on the market for the purpose of screening access to certain remote sites. Furthermore, most major online services offer blocking features as part of their regular menu of options (e.g., AOL Parental Controls).

A cookie file (also know simply as a "cookie") is a tool used on the web to facilitate and interpret this one-to-one interaction. Cookie files offer businesses the potential for more effective direct marketing of goods, services and information. For many e-businesses that operate over the Internet, cookie files are considered to be vital to the future success of on-line advertising and thus the generation of future business. Internet Explorer and Netscape allow a computer user to set the computer's browser such that all received cookie files are either automatically accepted (enabled) or rejected (disabled). In another user selectable browser mode, the computer user is prompted for a decision every time an individual cookie file is received.

What is needed is a method and system for screening remote site connections and filtering data (e.g., cookie files) based on a trust assessment performed by a community of collaborating end-users, rather than a rigid criteria established by a single end-user having only a limited knowledge of the remote sites.

BRIEF SUMMARY OF THE INVENTION

A computer-implemented method and system screens remote site connections according to a preferred embodiment of the present invention. A server receives, from a plurality of end-users, data based on a plurality of end-user assessments of particular remote sites. Each end-user is associated with a specific client machine which is in communication with the server. The server generates assessment scores based on the data. The server transmits the assessment scores to the client machines. Each specific client machine selectively takes protective action against ones of the particular remote sites that have an undesirable assessment score generated by the server. One protective action may be implemented to prevent the specific client machine from connecting to the ones of the particular remote sites that have an undesirable assessment score generated by the server. Another protective action may be implemented to filter specific content or instructions received from the ones of the particular remote sites that have an undesirable assessment score generated by the server.

Each of a plurality of client machine users creates a first list of remote sites which the user trusts, and a second list of remote sites which the user does not trust. The first and second lists are received from each of the client machines and storing in a database. The first and second lists are aggregated and assessed to generate a community aggregate trust assessment. Each specific client machine selectively takes protective action against ones of the particular remote sites based on one or more of (i) the first list created by the specific client machine, (ii) the second list created by the specific client machine, and (iii) the community aggregate trust assessment.

A server receives from a plurality of end-users, data based on a plurality of end-user assessments of particular remote sites. Each end-user is associated with a specific client machine which is in communication with the server. For each particular remote site, the server generates assessment scores based on the number of the end-users who trust the particular remote site, and the number of the end-users who do not trust the particular remote site. The server transmits the assessment scores to the client machines. Each specific client machine selectively takes protective action against ones of the particular remote sites that have an undesirable assessment score generated by the server.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

The present invention uses a client software program, through which end-users may specify if they trust, do not trust, or have no trust assessment for a particular remote site.

The client software program uses the end-user's trust assessment to take a particular protective action pertaining to the remote site. The protective action may include denying connectivity to the remote site or blocking connectivity from the remote site to the client machine. Alternatively, protective actions may involve filtering certain content or instructions from the remote site, such as unsolicited emails from the remote site, or cookie information provided by the remote site to the client machine's browser with the intent of storing a temporary or persistent cookie file on the client machine.

From time to time, the client software program connects to a remote community trust server to inform the server of the end-user's trust preferences for each site for which the end-user has provided a trust assessment.

The community trust server stores the transmitted trust preferences from multiple end-users who in effect form a trust assessment community. The data is processed on the community trust server to generate trust assessment scores for all sites for which data is available. The data, including trust assessment scores, is transmitted back to the client software in a format that shares the community's preferences with the client software.

The end-user may configure the client software to take protective action based on the community's aggregate assessment of a particular site in addition to the end-user's own preferences. For instance, a particular protective action could be triggered if less than 10% of the community trusts the site, or over 50% have specified that they do not trust the site, even if the end-user has not yet specified a trust assessment for the remote site.

In this way, individuals can form a community trust assessment network and empower themselves with trust information provided by the aggregate assessment of the community's members, in addition to their own individual preferences.

Figure 1:
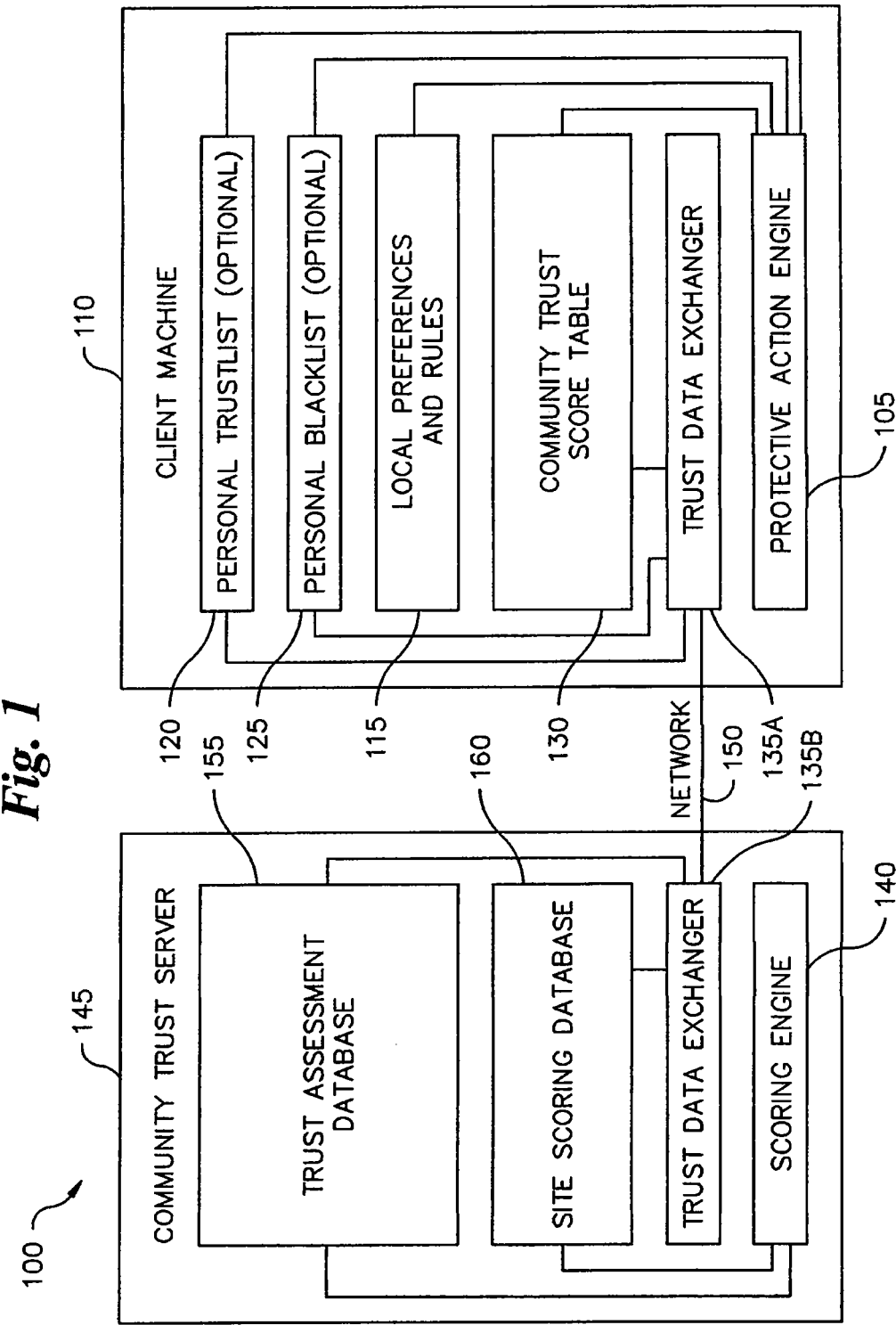
FIG. 1 shows a block diagram of a Community Trust Assessment System 100 operating in accordance with the present invention.

FIG. 1 shows a block diagram of a Community Trust Assessment System 100 operating in accordance with the present invention. A Protective Action Engine 105, residing on a Client Machine 110 as a component of the Client Software, makes determination about protection actions to take for a particular remote site based on a Local Preferences and Rules object 115, a Personal Trustlist 120, a Personal Blacklist 125, and the Community Trust Score Table 130.

Examples of protective action include:
(1) Denying connectivity to remote site;
(2) Blocking connectivity from remote site; and
(3) Filtering specific content or instructions from the remote site, such as unsolicited emails from the remote site, or cookie information provided by the remote site to the browser of the Client Machine 110 with the intent of storing a temporary or persistent cookie file on the Client Machine 110.

For example, if the user has specified a particular remote site in the Personal Trustlist, no protective action would be taken. If the user has specified a particular remote site in the Personal Blacklist, one or more protective actions could be taken if the user has specified in the Local Preferences and Rules object 115 that such action should be taken.

If, in the Local Preferences and Rules object 115, the end-user has indicated that they wish to make use of the Community Trust Assessment in some way, the Protective Action Engine 105 will do this. For instance, the end-user may wish to take a certain protective action for remote sites that are rated suspicious by 50% or greater of the community's members. In another example, a certain protective action would be taken for remote sites where the ratio of trusting users to suspicious users of that remote site is below 100%.

The Personal Trustlist 120, stored on the Client Machine 110, is a list of remote sites the end-user has designated as trusted using the client software. The Protective Action Engine, 105 based on the Local Preferences and Rules object 115, will factor in the user's designation of a remote site as trusted when deciding what protective action should be taken, if any.

The Personal Blacklist 125, stored on the Client Machine 110, is a list of remote sites the end-user has designated as suspicious using the client software. The Protective Action Engine 105, based on the Local Preferences and Rules object 115, will factor in the user's designation of a remote site as suspicious when deciding what protective action should be taken, if any.

In the Local Preferences and Rules object 115, the end-user of the client software specifies how they want the Protective Action Engine 105 to operate, and if they wish the Trust Data Exchanger 135 to participate in the community. For instance, one rule might be to ignore the community trust data entirely. Another rule might be for all sites that are trusted by over 90% of the community, no protective action should be taken unless the user has assessed the site as suspicious, and thus the client software has included it in the Personal Blacklist 125.

The Community Trust Score Table 130 is a locally stored table of aggregate scores of the remote sites as determined by the Scoring Engine on the Community Trust Server and communicated to the Client Machine 110 using the server's and client's respective Trust Data Exchangers 135A, 135B.

The table includes a set of remote sites, and for each remote site includes information that the Protective Action Engine 105 on the Client Machine 110 can use to decide on which protective action, if any, should be taken based on the Local Preferences and Rules object 115. The information in the table could include fields such as: number of community members who trust the site, number of community members who have designated the site as suspicious, total number of community members, percentage of community members who find the site suspicious, percentage of community members who trust the site, and percentage ratio of trusting members to suspicious members for that particular remote site.

| Remote Site (Primary Key) | number of trusting users | Number of suspicious users | Percentage community members who are suspicious | percentage of community members who trust | Percentage ratio trusting members to suspicious members |
|---|---|---|---|---|---|
| | | | | | |

Since this table is stored on the Client Machine 110, it may be stored in list format (such as a character delimited list) as well as in relational database format.

The Trust Data Exchanger 135A on the Client Machine 110, if permitted by the end-user's choice as recorded in the Local Preferences and Rules object 115, transmits the Personal Trustlist 120 and Personal Blacklist 125 to the Community Trust Server 145 over a network 150. The Trust Data Exchanger 135A can also receive a Community Trust Score Table 130 from the Trust Data Exchanger 135B of the Community Trust Server 145. The data can be exchanged in the form of complete or incrementally changed data.

The Trust Data Exchanger 135B of the Community Trust Server 145 can receive over the network 150, from the Client Machine 110, the Personal Trustlist 120 and Personal Blacklist 125 for inclusion in the Trust Assessment Database 155.

The Trust Data Exchanger 135B of the Community Trust Server 145 can also transmit data to the Client Machine 110 from the Site Scoring Database 160, which the Trust Data Exchanger 135B of the Community Trust Server 145 will store in the Community Trust Score Table object 130 on the Client Machine 110. The data can be exchanged in the form of complete or incrementally changed data.

The Scoring Engine 140 processes the data in the Trust Assessment Database 155 for inclusion in the Site Scoring Database 160. For instance, if there are five users in the Trust Assessment Database 155 that find a particular remote site suspicious, the entry in the Site Scoring Database 160 for a number of users that find a remote site suspicious would be listed as "5". The Scoring Engine 140 calculates, using the Trust Assessment Database 155 (incrementally or all at once), the values for any fields included in the Site Scoring Database 160 for each remote site, such as: number of trusting users, number of suspicious users, percentage of community members who find the site suspicious, percentage of community members who trust the site, and percentage ratio of trusting members to suspicious members for that particular remote site.

The Site Scoring Database 160 includes, for each remote site, an entry for various community trust metrics, such as: number of trusting users, number of suspicious users, percentage of community members who find the site suspicious, percentage of community members who trust the site, and percentage ratio of trusting members to suspicious members for that particular remote site.

The table structure of the Site Scoring Database 160 is as follows:

| Remote Site (Primary Key) | number of trusting users | Number of suspicious users | Percentage community members who are suspicious | percentage of community members who trust | Percentage ratio trusting members to suspicious members |
| --- | --- | --- | --- | --- | --- |

The Trust Assessment Database 155 includes, for each member of the community, an entry for each remote site that the community member has assessed, the "trust status" of the site (trusted or suspicious), and the date and time of the entry.

The table structure of the Trust Assessment Database 155 is as follows:

| Community Member ID (Primary Key part 1) | Remote Site (Primary Key part 2) | Trust Status either {trusted, suspicious} | Date and Time assessment received |
| --- | --- | --- | --- |

Figure 2:
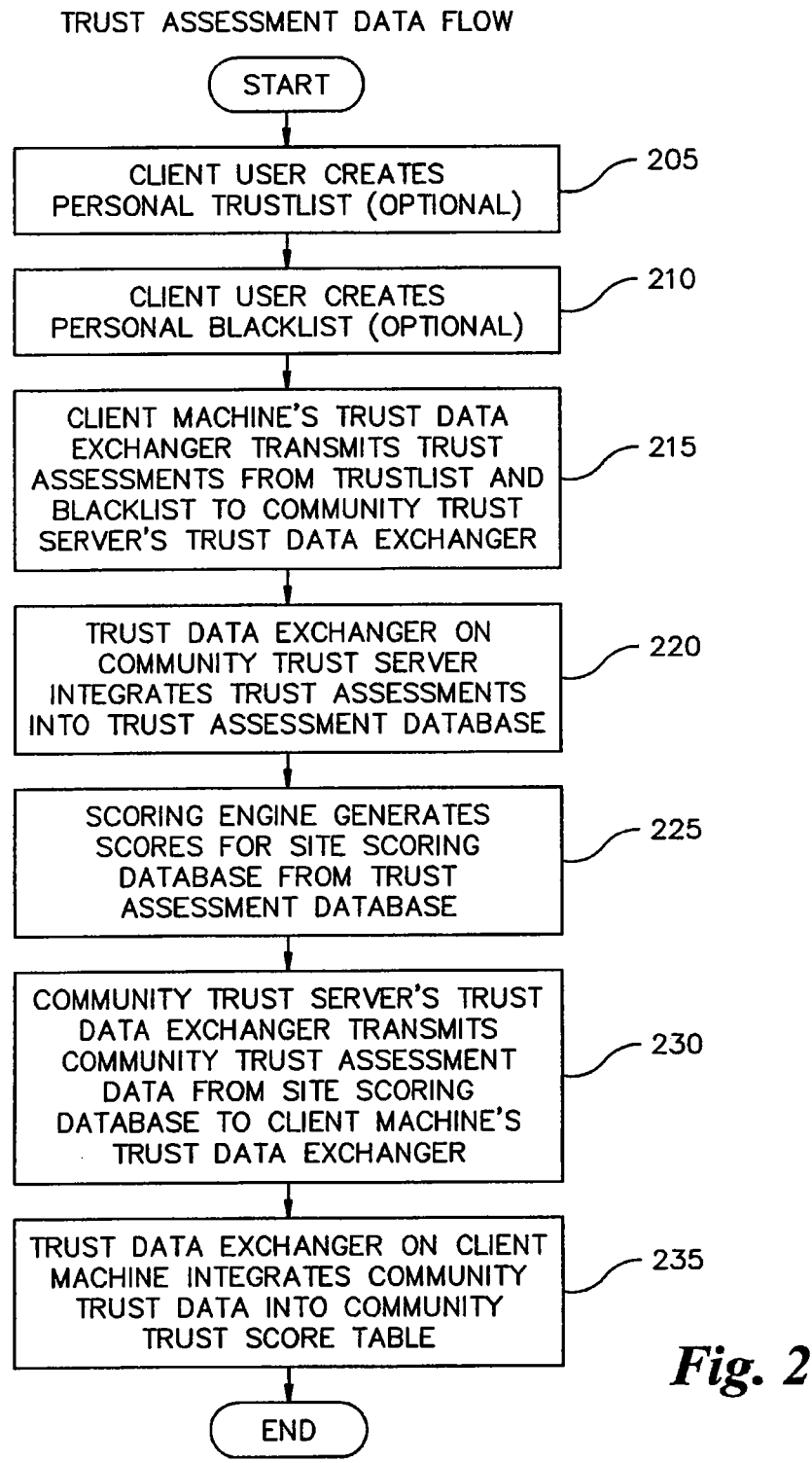
FIG. 2 is a Trust Assessment Data flow chart used in conjunction with the system of FIG. 1.

FIG. 2 shows a Trust Assessment Data flow whereby a Client Machine 110 used by an end-user must decide whether or not to invoke particular countermeasures to protect from a certain remote site. In step 205, the user of Client Machine 110 may optionally create a Personal Trustlist 120. In step 210, the user of Client Machine 110 may optionally create a Personal Blacklist 210. In step 215, the Trust Data Exchanger 135A of the Client Machine 110 transmits trust assessments from the Personal Trustlist 120 and the Personal Blacklist 125 to the Trust Data Exchanger 135B in the Community Trust Server 145. In step 220, the Trust Data Exchanger 135B in the Community Trust Server 145 integrates trust assessments into the Trust Assessment Database 155. In step 225, the Scoring Engine 140 generates scores for the Site Scoring Database 160 from the Trust Assessment Database 155. In step 230, the Trust Data Exchanger 135B of the Community Trust Server 145 transmits Community Trust Assessment Data from the Site Scoring Database 160 to the Trust Data Exchanger 135B of the Client Machine 110 via network 150. In step 235, the Trust Data Exchanger 135A on the Client Machine 110 integrates Community Trust Data into the Community Trust Score Table 130.

Figure 3:
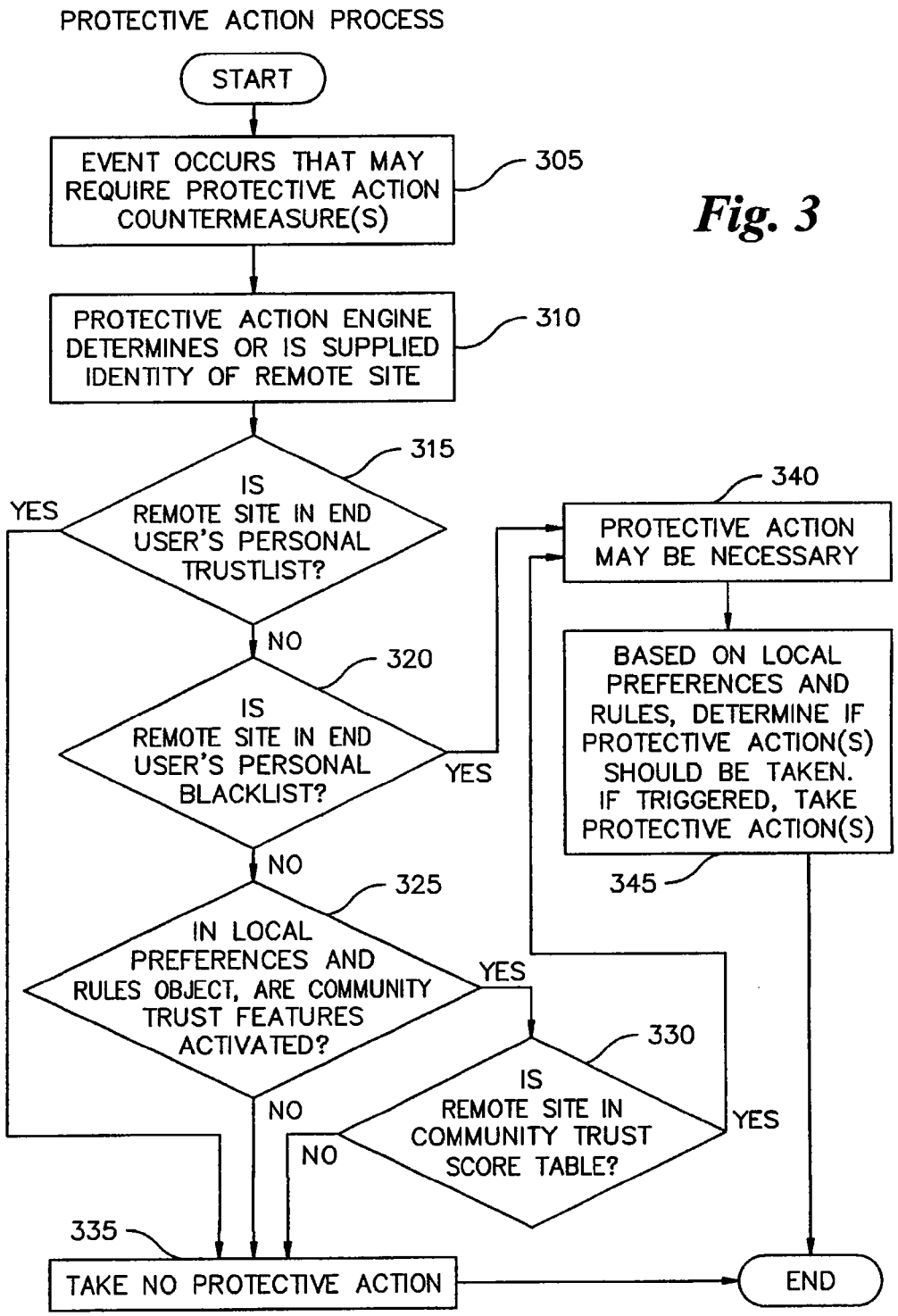
FIG. 3 is a Protective Action Process flow chart used in conjunction with the system of FIG. 1.

FIG. 3 shows a Protective Action Process which demonstrates how individual trust assessments become part of the community and are transmitted back to individual users in aggregate.

The primary algorithm of the Community Trust Assessment System 100 is the Protective Action Algorithm, as depicted in FIG. 3. This algorithm allows the Client Machine 110 to benefit from the end-user's preferences and trust assessments as well as the trust assessment of the community when determining whether or not to take one or more protective actions.

The Protective Action Algorithm begins in step 305 when an event occurs that may require Protective Action countermeasure(s). For example, a remote site on the end-user's Blacklist, or despised by the community in general, may be attempting to place a cookie on the end-user's Client Machine 110, or may have already succeeded in doing so.

In step 310, the Protective Action Engine must determine the identity of the remote site, for example, by looking up the host name of the remote site based on its IP number. The Protective Action Engine may have already been informed of the identity of the remote site by the client program when the event was detected or triggered.

In step 315, the remote site is compared to the end-user's Personal Trustlist 120. If the remote site is in the Personal Trustlist 120, and hence a trusted site, no further action is taken.

In step 320, the remote site is compared to the end-user's Personal Blacklist. If the remote site is in the Blacklist, and hence a suspicious site, protective action is taken based on the end-user's Local Preferences and Rules object 115 (steps 340, 345). For instance, the end-user may have specified that for all remote sites in the Blacklist, all possible protective actions should be taken for events pertaining to the remote site. The protective actions could include cookie deletion, content filtering, and even the blocking of all network activity to and from the remote site from and to the Client Machine 110.

If the remote site is not in the Blacklist, the Local Preferences and Rules object is checked to see if the Community Trust Features are activated (step 325). If the features are not activated, no further protective action is taken (step 335).

If the Community Trust Features are activated, the end-user has stated that they wish to take protective actions based on the community's aggregate trust assessment as stored on the Client Machine 110 in the Community Trust Score Table (step 330).

In this case, based on the Local Preferences and Rules object 115, one or more protective action(s) may be taken. For instance, the end-user could specify that the Protective Action Engine 105 should block cookies from all sites that more than 25% of the community finds suspicious. The end-user may wish all network activity to be blocked to and from remote sites that more than 50% of the community finds suspicious.

The Protective Action Engine 105 takes protective action countermeasures against remote sites based on locally stored trust assessments specified by the end-user, combined with a community's aggregate trust assessment. In addition to the present invention, the software application provides further functionality to the user. This functionality includes the following:

(1) The ability for the user to download a Watchlist of potentially suspicious sites as designated by a central authority;

(2) The ability for the user to manually retrieve the latest privacy Watchlist from the server;

(3) The ability for the user to view client cookies;

(4) The ability for the user to select and manually delete cookies; and (5) The ability for the user to enable/disable the Protective Action Engine.

The present invention is capable of running on any hardware configuration that is used as part of today's technology. In order to participate in the community trust system and interact with the Trust Data Exchanger 135B of the Community Trust Server 145, the Client Machine 110 must be able to connect to the Community Trust Server 145 over the network 150.

The present invention may be used with any computer operating system. However, in today's modern marketplace, Microsoft Windows is the most commonly used computer operating system. Therefore, although programming has not been completed for all operating systems, the application is currently available for use with the Microsoft Windows® operating system in the following versions: Windows 95, Windows 98, Windows Me, Windows NT, Windows 2000, and Windows XP. The client software must have connectivity to the Internet to enable key features, such as participation in the community trust system.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

I claim:

1. A computer-implemented method of screening remote site connections, the method comprising:

(a) receiving at a server from a plurality of end-users, data based on a plurality of end-user assessments of particular remote websites, each end-user being associated with a specific client machine which is in communication with the server, wherein for at least some of the remote websites, the server receives end-user assessment data for the same remote website from a plurality of end-users, wherein the end-user assessment data provides to the server, for each end-user, an identification of particular remote websites that the respective end-user classified as trusted sites or suspicious sites;

(b) the server generating assessment scores for the particular remote websites based on the data;

(c) the server transmitting the assessment scores to the client machines; and (d) each specific client machine selectively taking protective action against ones of the particular remote websites that have an undesirable assessment score generated by the server, wherein the end-users and the remote websites are different and unrelated types of entities.

2. The method of claim 1 wherein the protective action prevents the specific client machine from connecting to the ones of the particular remote websites that have an undesirable assessment score generated by the server.

3. The method of claim 1 wherein the protective action filters specific content or instructions received from the ones of the particular remote websites that have an undesirable assessment score generated by the server.

4. The method of claim 1 wherein the assessment scores are generated based on data regarding a percentage of end-users who assess a particular remote website as being a trusted site or a suspicious site.

5. The method of claim 1 wherein the data received at the server in step (a) is provided from at least one of personal trustlists and personal blacklists located at respective client machines, the personal trustlists including particular remote websites that the respective end-user classified as trusted sites, and the personal blacklists including particular remote websites that the respective end-user classified as suspicious sites.

6. The method of claim 1 wherein the identification that the server receives of particular remote websites that end-users have classified includes identifications of remote websites that were classified as trusted sites and identifications of remote websites that were classified as suspicious sites.

7. A computer-implemented method of screening remote site connections, the method comprising:

(a) receiving at a server from a plurality of end-users, data based on a plurality of end-user assessments of particular remote websites, each end-user being associated with a specific client machine which is in communication with the server, wherein for at least some of the remote websites, the server receives end-user assessment data for the same remote websites from a plurality of end-users;

(b) for each particular remote website, the server generating assessment scores based on the number of the end-users who provide an identification to the server that the end-user classified the particular remote website as a trusted site, and the number of end-users who provide an identification to the server that the end-user classified the particular remote website as a site that is not trusted;

(c) the server transmitting the assessment scores to the client machines; and (d) each specific client machine selectively taking protective action against ones of the particular remote websites that have an undesirable assessment score generated by the server, wherein the end-users and the remote websites are different and unrelated types of entities.

8. The method of claim 7 wherein the protective action prevents the specific client machine from connecting to the ones of the particular remote websites that have an undesirable assessment score generated by the server.

9. The method of claim 7 wherein the protective action filters specific content or instructions received from the ones of the particular remote websites that have an undesirable assessment score generated by the server.

10. The method of claim 7 wherein the data received at the server in step (a) is provided from at least one of personal trustlists and personal blacklists located at respective client machines, the personal trustlists including particular remote websites that the respective end-user classified as trusted sites, and the personal blacklists including particular remote websites that the respective end-user classified as being not trusted.

11. A system for screening remote site connections, the system comprising:
   (a) a plurality of client machines; and
   (b) a server in communication with the client machines, the server receiving data based on a plurality of end-user assessments of particular remote websites, each end-user being associated with a specific one of the client machines, wherein for at least some of the remote websites, the server receives end-user assessment data for the same remote website from a plurality of end-users, wherein the end-user assessment data provides to the server, for each end-user, an identification of particular remote websites that the respective end-user classified as trusted sites or suspicious sites:
      (i) the server generates assessment scores for the particular remote websites based on the data;
      (ii) the server transmits the assessment scores to the client machines; and
      (iii) each specific client machine selectively takes protective action against ones of the particular remote websites that have an undesirable assessment score generated by the server, the end-users and the remote websites being different and unrelated types of entities.

12. The system of claim 11 wherein the protective action prevents the specific client machine from connecting to the ones of the particular remote websites that have an undesirable assessment score generated by the server.

13. The system of claim 11 wherein the protective action filters specific content or instructions received from the ones of the particular remote websites that have an undesirable assessment score generated by the server.

14. The system of claim 11 wherein the data received at the server in step (a) is provided from at least one of personal trustlists and personal blacklists located at respective client machines, the personal trustlists including particular remote websites that the respective end-user classified as trusted sites, and the personal blacklists including particular remote websites that the respective end-user classified as suspicious sites.

15. The system of claim 11 wherein the identification that the server receives of particular remote websites that end-users have classified includes identifications of remote websites that were classified as trusted sites and identifications of remote websites that were classified as suspicious sites.

16. A system for screening remote site connections, the system comprising:
   (a) a plurality of client machines that generate data based on a plurality of end-user assessments of particular remote websites, each end-user being associated with a specific one of the client machines, wherein for at least some of the remote websites, end user-assessment data is generated for the same remote website from a plurality of end-users; and
   (b) a server in communication with the client machines, the server receiving the data based on a plurality of end-user assessments of particular remote websites, wherein:
      (i) the server generates assessment scores for the particular remote websites based on the number of the end-users who provide an identification to the server that the end-user classified the particular remote website as a trusted site, and the number of end-users who provide an identification to the server that the end-user classified the particular remote website as a site that is not trusted;
      (ii) the server transmits the assessment scores to the client machines; and
      (iii) each specific client machine selectively takes protective action against ones of the particular remote websites that have an undesirable assessment score generated by the server,
      the end-users and the remote websites being different and unrelated types of entities.

17. The system of claim 16 wherein the protective action prevents the specific client machine from connecting to the ones of the particular remote websites that have an undesirable assessment score generated by the server.

18. The system of claim 16 wherein the protective action filters specific content or instructions received from the ones of the particular remote websites that have an undesirable assessment score generated by the server.

19. The system of claim 16 wherein the data received at the server in step (a) is provided from at least one of personal trustlists and personal blacklists located at respective client machines, the personal trustlists including particular remote websites that the respective end-user classified as trusted sites, and the personal blacklists including particular remote websites that the respective end-user classified as being not trusted.

20. A computer program product for screening remote site connections, the computer program product comprising non-transitory computer-readable media encoded with instructions for execution by a processor to perform a method comprising:
   (a) receiving at a server from a plurality of end-users, data based on a plurality of end-user assessments of particular remote websites, each end-user being associated with a specific client machine which is in communication with the server, wherein for at least some of the remote websites, the server receives end-user assessment data for the same remote website from a plurality of end-users, wherein the end-user assessment data provides to the server, for each end-user, an identification of particular remote websites that the respective end-user classified as trusted sites or suspicious sites;
   (b) the server generating assessment scores for the particular remote websites based on the data;
   (c) the server transmitting the assessment scores to the client machines; and
   (d) each specific client machine selectively taking protective action against ones of the particular remote websites that have an undesirable assessment score generated by the server,
   wherein the end-users and the remote websites are different and unrelated types of entities.

21. The computer program product of claim 20 wherein the protective action prevents the specific client machine from connecting to the ones of the particular remote websites that have an undesirable assessment score generated by the server.

22. The computer program product of claim 20 wherein the protective action filters specific content or instructions received from the ones of the particular remote websites that have an undesirable assessment score generated by the server.

23. The computer program product of claim 20 wherein the assessment scores are generated based on data regarding a percentage of end-users who assess a particular remote website as being a trusted site or a suspicious site.

24. The computer program product of claim 20 wherein the data received at the server in step (a) is provided from at least one of personal trustlists and personal blacklists located at respective client machines, the personal trustlists including particular remote websites that the respective end-user classified as trusted sites, and the personal blacklists including particular remote websites that the respective end-user classified as suspicious sites.

25. The system of claim 20 wherein the identification that the server receives of particular remote websites that end-users have classified includes identifications of remote websites that were classified as trusted sites and identifications of remote websites that were classified as suspicious sites.

26. A computer program product for screening remote site connections, the computer program product comprising non-transitory computer-readable media encoded with instructions for execution by a processor to perform a method comprising
(a) receiving at a server from a plurality of end-users, data based on a plurality of end-user assessments of particular remote websites, each end-user being associated with a specific client machine which is in communication with the server, wherein for at least some of the remote websites, the server receives end-user assessment data for the same remote websites from a plurality of end-users;
(b) for each particular remote website, the server generating assessment scores based on the number of the end-users who provide an identification to the server that the end-user classified the particular remote website as a trusted site, and the number of end-users who provide an identification to the server that the end-user classified the particular remote website as a site that is not trusted;
(c) the server transmitting the assessment scores to the client machines; and
(d) each specific client machine selectively taking protective action against ones of the particular remote websites that have an undesirable assessment score generated by the server,
wherein the end-users and the remote websites are different and unrelated types of entities.

27. The computer program product of claim 26 wherein the protective action prevents the specific client machine from connecting to the ones of the particular remote websites that have an undesirable assessment score generated by the server.

28. The computer program product of claim 26 wherein the protective action filters specific content or instructions received from the ones of the particular remote websites that have an undesirable assessment score generated by the server.

29. The computer program product of claim 26 wherein the data received at the server in step (a) is provided from at least one of personal trustlists and personal blacklists located at respective client machines, the personal trustlists including particular remote websites that the respective end-user classified as trusted sites, and the personal blacklists including particular remote websites that the respective end-user classified as being not trusted.

* * * * *